(12) United States Patent
Hesse

(10) Patent No.: US 10,982,489 B2
(45) Date of Patent: Apr. 20, 2021

(54) METHOD AND DEVICE FOR DETECTING A TENSILE FORCE EXERTED WHILE PULLING A PIPE OR LINE DURING INSTALLATION

(71) Applicant: TRACTO-TECHNIK GmbH & Co. KG, Lennestadt (DE)

(72) Inventor: Holger Hesse, Greven (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 56 days.

(21) Appl. No.: 15/755,004

(22) PCT Filed: Aug. 26, 2016

(86) PCT No.: PCT/EP2016/001435
§ 371 (c)(1),
(2) Date: Feb. 23, 2018

(87) PCT Pub. No.: WO2017/032457
PCT Pub. Date: Mar. 2, 2017

(65) Prior Publication Data
US 2019/0316418 A1 Oct. 17, 2019

(30) Foreign Application Priority Data
Aug. 26, 2015 (DE) ...................... 10 2015 010 977.4

(51) Int. Cl.
*E21B 7/04* (2006.01)
*E21B 7/20* (2006.01)
(Continued)

(52) U.S. Cl.
CPC .............. *E21B 7/046* (2013.01); *E21B 7/128* (2013.01); *E21B 7/20* (2013.01); *E21B 23/14* (2013.01); *H02G 1/081* (2013.01)

(58) Field of Classification Search
CPC combination set(s) only.
See application file for complete search history.

(56) References Cited

U.S. PATENT DOCUMENTS

| 4,458,880 A | | 7/1984 | Conti | |
|---|---|---|---|---|
| 5,447,074 A | * | 9/1995 | Polaert | ................. G01G 3/1402 73/763 |

(Continued)

FOREIGN PATENT DOCUMENTS

| DE | 8234075 U1 | 4/1984 |
|---|---|---|
| DE | 29724364 U1 | 12/2000 |

(Continued)

OTHER PUBLICATIONS

F.W. Gunthert, G. Walther "Untersuchungen zur Erfassung der Lasteinwirkungen auf Rohre aus Polyethylen hoher Dichte und Erarbeitung der statischen Berechnungsverfahren bei Umwelt entlastender und grabenloser Rohrverlegung mit dem Raketenpflug" Deutsche Bundesstiftung Umwelt, Abschlussbericht AZ 17296, 2002 pp. 5 to 14, 36 to 44, picutures 5, 6, 19, 20, table 1 and English machine translation.

(Continued)

*Primary Examiner* — Kyle Armstrong
(74) *Attorney, Agent, or Firm* — Howard IP Law Group, PC

(57) ABSTRACT

A method for capturing a tensile force exerted during the pulling of a pipe or line during installation, includes capturing a strain on the pipe or line via one or more sensors arranged on the pipe or line. Multiple strain sensors may be arranged such that they are offset at various angles across the circumference of the element being installed. One or more sensors may be mounted to a towing head for pulling the pipe or the line during installation.

16 Claims, 1 Drawing Sheet

(51) Int. Cl.
*E21B 7/128* (2006.01)
*E21B 23/14* (2006.01)
*H02G 1/08* (2006.01)

(56) References Cited

U.S. PATENT DOCUMENTS

| | | | |
|---|---|---|---|
| 5,833,015 A | 11/1998 | Hesse et al. | |
| 6,616,378 B2 * | 9/2003 | Turner | E21B 7/20 254/134.3 FT |
| 7,296,597 B1 * | 11/2007 | Freyer | E21B 33/1208 138/89 |
| 2001/0024597 A1 * | 9/2001 | Turner | E21B 7/20 405/184 |
| 2006/0088384 A1 * | 4/2006 | Putnam | F16L 55/1658 405/184.1 |
| 2010/0089463 A1 * | 4/2010 | Beeson | C21D 8/10 137/236.1 |
| 2014/0027000 A1 * | 1/2014 | Kiest, Jr. | F16L 55/1653 138/97 |
| 2014/0216587 A1 * | 8/2014 | Khalifa | F16L 55/18 138/97 |
| 2016/0372900 A1 * | 12/2016 | Angermann | H02G 1/08 |

FOREIGN PATENT DOCUMENTS

| | | | | |
|---|---|---|---|---|
| DE | 102013101381 A1 | | 8/2014 | |
| EP | 0445312 A1 | | 9/1991 | |
| GB | 2537342 A | * | 10/2016 | G01L 1/22 |
| WO | 2006064284 A1 | | 6/2006 | |

OTHER PUBLICATIONS

International Search Report dated Nov. 16, 2016 for related PCT Application No. PCT/EP2016/001435.

* cited by examiner

METHOD AND DEVICE FOR DETECTING A TENSILE FORCE EXERTED WHILE PULLING A PIPE OR LINE DURING INSTALLATION

CROSS-REFERENCE TO RELATED APPLICATIONS

This application is a national phase application under 35 U.S.C. § 371 of International Patent Application No. PCT/EP2016/001435 filed Aug. 26, 2016, which claims priority to German Application No. 10 2015 010 977.4 filed Aug. 26, 2015, the entire contents of all of which are incorporated herein by reference for all purposes.

FIELD OF THE INVENTION

The invention relates to a method and device for detecting a tensile force exerted while pulling a pipe or line during installation.

BACKGROUND

Pulling a pipe or line during installation typically is performed such that a pilot hole is first drilled from a starting point to an end point by driving a drill string through the ground with a driving mechanism. The drill string can be driven into the ground with a twisting motion and/or by pushing or pulling. Driving said drill string by means of a percussion mechanism also is possible. At the end point, a pipe or line can be connected to the drill string, wherein a coupling transfers the tensile forces from the drill string to the pipe or line, but not the twisting motion. If the diameter of the pipe or line is equal to or smaller than the diameter of the drill string, it is not necessary to expand the pilot hole while pulling the pipe or line through said hole. If the diameter of the pipe or line is greater than the diameter of the drill string, a reamer must be installed between the drill string and the coupling attached to the pipe or line, which serves to loosen and remove the ground and rock around the pilot hole up to the diameter of the reamer. To facilitate the loosening and removal of the ground and rock, and to accomplish the transport of the same to the surface, a rinsing liquid can be conveyed to the reamer, which can comprise a bentonite suspension with adjustable viscosity. At least a portion of the thixotropic bentonite suspension typically flows through a ring channel between the expanded drill hole and the pipe or line being installed, diminishing the friction between the wall of the expanded drill hole and the pipe or line.

The detection of the tensile forces exerted on the pipe or line typically is conducted by means of a tensile force measuring device arranged at the coupling between the end of the drill string and the pipe or line, wherein the detected tensile force is conveyed to a data logger and/or the data is transferred simultaneously via radio waves. For example, DE 297 24 364 U1 describes a device for pulling pipes or cables through a pilot hole, wherein a coupling with an integrated tensile force measurement device is arranged between the pipe or line being installed.

The permissible tensile forces for the installation of plastic pipes, for example, depend on the duration and the temperature of the pipe wall of the plastic pipe. A need exists to evaluate the quality of the installation and of the installed pipeline, for warranty reasons alone. According to the known technical solutions, only the tensile forces exerted longitudinally at the leading end of the pipe are detected.

The evaluation of the permissible tensile forces always is performed under the assumption that the thickness of the pipe wall is equivalent to the smallest permitted wall thickness. As the measurement is performed indirectly, tolerances are indicated, with the result that far lower tensile forces are typically used than would be possible from a purely technical perspective. This results in unused potential, as a higher tensile force would directly translate to longer installation lengths.

On the other hand, pipe wall temperatures higher than those anticipated in the calculation bases lead to a reduction of the permissible tensile force, which increases the risk of damaging the pipe during the pulling process.

SUMMARY

The object of the invention therefore is to make it possible to detect the impact of the tensile force exerted during the pulling, so as to facilitate the improved installation of a pipe or line.

The object is achieved by the subject matter disclosed herein. Advantageous embodiments are also disclosed herein.

The invention is based on the principle of monitoring the strain on the pipe or line to be pulled into the ground or into the old pipe, as changes of the pressure-bearing wall of the element being installed can be detected and impermissible changes can be determined directly at the construction site during installation. Basically, as this principle operates without the need to determine the exact pipe design with regard to diameter and wall thickness tolerance, and with an unknown elastic modulus and wall temperature of the element to be installed, at least initially, the strain on the pipe or line in axial direction can be determined easily and securely. A detection device can be placed on the wall of the element being installed, at its leading end seen in the direction in which it is to be pulled, which records the strain in longitudinal direction at one or more locations of the wall of the element being installed. The inventive approach makes it possible to record the tensile force directly by measuring the strain at the element being installed.

The principle on which the invention is based is applicable to all trenchless installation processes for pipes, in particular for plastic pipes. The pipes also can be made of metal.

The invention creates a method for capturing a tensile force exerted during the pulling of a pipe or line during installation, wherein the strain on the pipe or line is captured via one or more sensors arranged on the pipe or line. This way, the observations of the effects of the forces acting upon the element being installed are captured directly. During the capturing process, the actual wall thickness and wall temperature of the element being installed are automatically considered in the measurement. For example, an excessive tensile force can lead to the plastic deformation of the element being installed, which can be verified directly through the changes in the element being installed.

The term "pipe" in the sense of this invention includes any elongated hollow body, the length of which typically is significantly greater than its diameter. A "pipe" in the sense of the invention specifically could have a circular diameter, although other cross-sectional shapes, for example, elliptical or polygon-shaped, also are possible. The term "pipe" includes pipes made of various materials, although plastic material is preferred. The term "line" in the sense of the invention describes pipelines, which serve, for example, to transport fluids or pumpable solids, where a pipeline can also include fittings, connection elements and/or seals. The term "line" also describes cables.

The strain can be measured optically, electrically or mechanically. Corresponding sensors and measurement devices are feasible. The strain can be recorded and/or transmitted to another device. Specifically, the other device could be a storage medium or signal processor.

The term "strain sensor" in the sense of the invention includes a strain gauge, which can be used to apply a direct method of measurement of the strain via detecting the change of electrical values. To achieve this, the strain gauge can preferably be firmly bonded with the element being installed, that is, with the pipe or line. The use of strain gauges with multiple measuring grids facilitates the simultaneous recording of longitudinal strain and circumference reduction. Another option for recording minimal strains over great lengths is the use of a fiber Bragg grating. The term "strain sensor" therefore also includes a fiber Bragg grating. To form a fiber Bragg grating, optical fibers can be affixed with adhesive, which, depending on their respective lengths, filter a defined light wavelength, which can be analyzed with optical methods. If the length of the optical fibers changes due to strain, the filtered light wavelength changes, which makes it an indicator for the strain occurring at that time. At the same time, the change in pipe wall temperature during the installation can be derived from the change in wavelength, and subsequently compensated.

As shown in the example, the strain during the pulling of the element being installed can be evaluated directly. The strain can directly be disaggregated into elastic and plastic strain.

In one preferred embodiment, one or more of the sensors are mounted to the pipe or line. This creates a simple option of determining the strain directly on the element being installed. The strain sensor can be mounted to the interior wall of an element being installed, in particular of a pipe or line. Preferably, the mounting is conducted via a firm bond, such as affixing it to the pipe with adhesive, preferably on the interior surface, or by mechanical coupling, such as bracing or interlocking. The strain sensor can at least partially be mounted directly or indirectly to the wall of the element being installed. One end of the strain sensor can be mounted to the wall of the element being installed. Preferably, the mounting location is selected such that one end of the strain sensor, insofar as the sensor is only partially mounted to the wall, is mounted in a section of the wall that is located a distance away from the end of the element being installed. Hereby, at least one section of the element being installed can be measured in terms of longitudinal strain. Thus, the strain sensor can at least be partially connected to the wall of the element being installed or be partially mounted to said wall.

Preferably, one or more of the sensors are mounted to a towing head, from which the pipe or line is being pulled. The strain sensor can be mounted on the towing head with one end and on the element being installed with the other end, such that a planar connection with the pipe wall over the length of the strain sensor becomes unnecessary. Instead, it can be arranged to connect one end of the strain sensor with the towing head and the other end with the element being installed.

Preferably, the temperature in the area around the sensor is detected to facilitate compensating for the measured results. The temperature detected in the sensor area can be recorded and/or simultaneously transmitted to a signal processor.

In one preferred embodiment, the strain on the pipe or line is detected with circumferentially distributed sensors. Preferably, multiple strain sensors are arranged such that they are offset at various angles across the circumference of the element being installed. The strain sensors can be arranged at equidistant angles. However, it also is possible to detect a strain on the element being installed at multiple locations spaced apart in a longitudinal direction. For example, two strain sensors can be arranged along a longitudinal axis or offset with each other (that is, offset at an angle).

The invention also creates a device for detecting a tensile force exerted while pulling a pipe or line during installation, wherein the device includes a strain sensor. The strain sensor can be connected with a towing head of an installation device. Alternatively or additionally, the strain sensor can be connected to enable the wireless communication of signals.

The term "installation device" is meant to include any device, with which a pipe or line can be pulled into the ground during installation. The device can be an HDD (Horizontal Directional Drilling) device or a self-propelled device.

The term "connection with a towing head" in the sense of the invention also includes the feeding through of a cable that is connected to the strain sensor and which can be used to transmit the signal captured by the strain sensor. This way, it is possible to transmit the signals present at the strain sensor, which correspond to the strain, via said cable and another cable that may be connected to it, from the towing head to the surface. However, alternatively or additionally, it is also possible that the strain sensor includes a connection with a recording device, which could, for example, be analyzed with regards to the data contained in the signals from the strain sensor only after the pipe has been installed and the towing head retrieved. Alternatively or additionally, the strain sensor could include a connection for wirelessly communicating the signal present at the strain sensor, which is created in response to the strain on the element being installed. A wireless communication facilitating the monitoring of the threshold values during the installation process is preferred.

In one preferred embodiment, the strain sensor is at least partially mounted to the towing head. Preferably, one of the ends of the strain sensor is connected with the element being installed, such that a strain between the towing head and the element being installed can be detected. If the strain sensor is at least partially mounted to the towing head, the design takes advantage of the fact that the element being installed is firmly braced with the towing head, such that any strain between the towing head and the element being installed indicates a strain in the element being installed, with that strain being present over the distance between the two mounting locations of the strain sensor.

In one preferred embodiment, a temperature sensor is arranged adjacent to the strain sensor near the towing head. The temperature sensor can be used to detect the temperature in the area around the strain sensor, which makes it possible to compensate for the measured temperature changes caused by the strain.

In one preferred embodiment, the strain sensor includes a mounting element at one of its ends, which is designed to be connected to the pipe, the pipeline or the cable.

Neither the explanations given above, nor the following specifications of exemplary embodiments represent a relinquishment of certain embodiments or characteristics.

BRIEF DESCRIPTION OF THE DRAWINGS

The invention is explained in more detail in the following, using exemplary embodiments shown in the drawings.

The drawings show.

DETAILED DESCRIPTION

Figure 1:
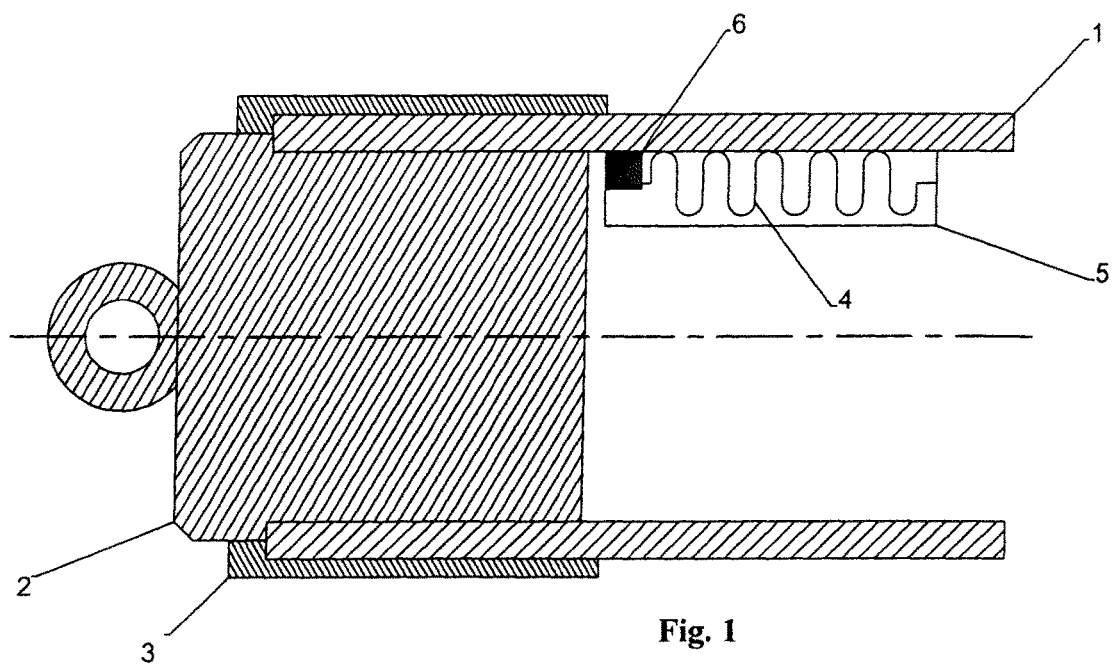
FIG. 1 An embodiment in a partially cross-sectional diagram, wherein a strain sensor is arranged behind a towing head FIG. 2 Another embodiment in a partially cross-sectional diagram, wherein a strain sensor is mechanically connected with a towing head

FIG. 1 shows an embodiment of a device for detecting a tensile force exerted during the installation of a pipe 1 or a line. The pipe 1 is braced with a towing head 2 via a clamping sleeve 3, such that the pipe 1 can be pulled into the ground with the towing head 2, which is connected to a pulling device (not shown). In the area of that end of the pipe 1, which is adjacent to the towing head 2, a sensor 4 is mounted to the interior wall of the pipe 1, which is designed as a strain sensor. The strain at the sensor 4 can be detected via a detection unit 5.

The sensor 4 is positioned in pipe 1 such that it cannot change position. The sensor 4 detects the strain at the surface of the pipe 1 via the detection unit 5. To this end, the two ends of the sensor 4 are firmly connected to the pipe 1. The sensor 4 corresponds to a measurement section connected to the pipe 1. The connection between the sensor 4 and the pipe 1 can be realized by affixing the sensor 4 to the pipe 1 with adhesive. Alternatively or additionally, a mechanical connection, for example by bolting, bracing or interlocking, can be provided.

A temperature sensor 6 is arranged on the interior wall of the pipe 1 adjacent to the sensor 4, which can be used to detect the temperature in the area of the interior wall of the pipe 1. The value can be measured by attaching a sensor to the pipe wall, although it is also or alternatively possible to capture the value contactlessly via an appropriate transducer.

Figure 2:
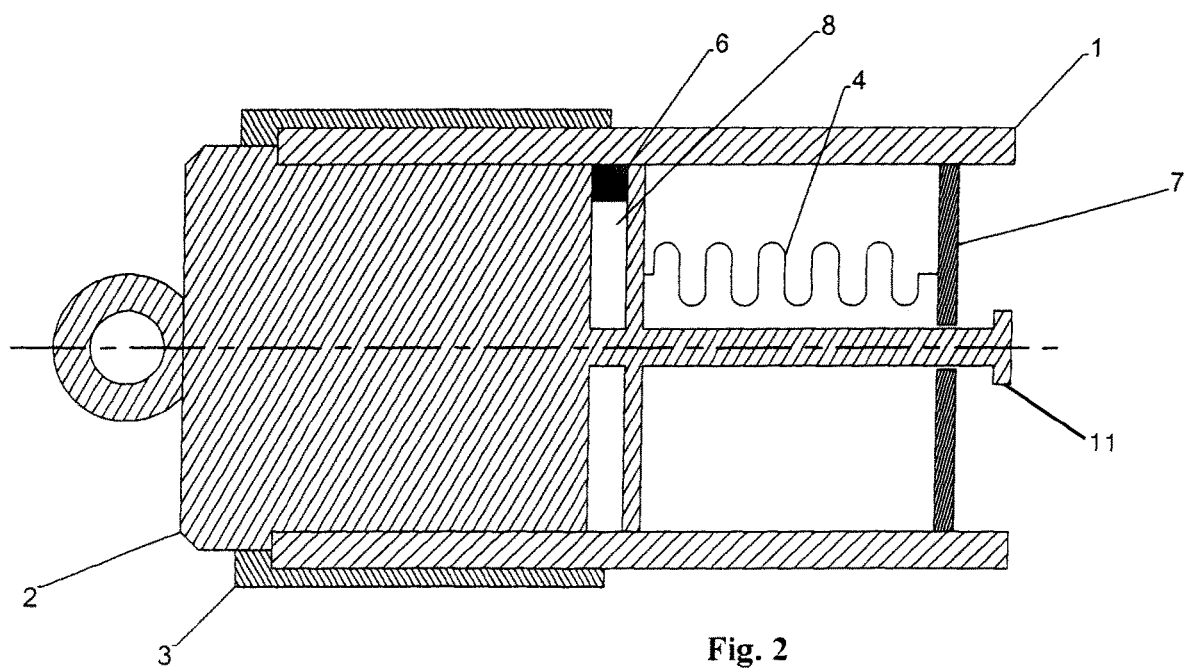

FIG. 2 shows another embodiment of a device for detecting a tensile force exerted during the installation of a pipe 1 or a line. One end of the sensor 4 is connected to the towing head 2 and another end of the sensor 4 is connected to a bar 7, in this case an interior clamping device, which can be firmly bonded with the pipe 1. The towing head 2 shown in FIG. 2 is modified compared to the embodiment in FIG. 1, in that a stop 11 for the bar 7 is provided. Bar 7 is free to move when the pipe 1 is strained, causing the distance between said bar 7 and the towing head 2 to increase. The stop 11 serves as a strain limiter to prevent excessive strain in case of overload. Furthermore, the embodiment in FIG. 2 provides a holding fixture 8 for the temperature sensor 6 in the towing head 2.

The invention claimed is:

1. A method for detecting a tensile force exerted on a pipe or a pipeline while pulling the pipe or the pipeline during installation, comprising:
    detecting a strain on the pipe or the pipeline by one or more sensors, at least one of the one or more sensors having an end mounted to a towing head and an other end mounted to the pipe or the pipeline.

2. The method according to claim 1, wherein the other end of the one of the one or more sensors being mounted to the pipe or the pipeline comprises the other end being bonded or mechanically coupled to the pipe or the pipeline.

3. The method according to claim 1, wherein the end of the one of the one or more sensors being mounted to the towing head, which is used to pull the pipe or the pipeline during installation, comprises the end being bonded or mechanically coupled to the towing head so as to detect strain between the towing head and the pipe or the pipeline.

4. The method according to claim 1, wherein the temperature in the area of the one or more sensors is detected.

5. The method according to claim 1, wherein the one or more sensors comprise a plurality of circumferentially distributed sensors configured to detect a strain on the pipe or the pipeline.

6. The method according to claim 1, wherein the one of the one or more sensors comprise a strain sensor, wherein an end of the strain sensor is bonded or mechanically coupled to the towing head.

7. The method according to claim 6, wherein the other end of the strain sensor is mounted to the pipe or the pipeline.

8. The method according to claim 1, wherein the one of the one or more sensors comprise a strain sensor, and wherein the other end of the strain sensor is bonded or mechanically coupled to an interior wall of the pipe or the pipeline.

9. A device for detecting a tensile force exerted on a pipe or a pipeline while pulling the pipe or the pipeline with a towing head of a pulling device during installation, wherein the device includes a strain sensor having an end mounted to the towing head and an other end mounted to the pipe or the pipeline for detecting the strain on the pipe or the pipeline, wherein the strain sensor is connected to a recording device, and/or the strain sensor is connected to allow for the wireless communication of signals.

10. The device according to claim 9, wherein the end of the strain sensor being mounted to the towing head used to pull the pipe or the pipeline during installation, comprises the end being bonded or mechanically coupled to the towing head so as to detect strain between the towing head and the pipe or the pipeline.

11. The device according to claim 9, wherein a temperature sensor is arranged at the towing head adjacent to the sensor.

12. The device according to claim 9, wherein the strain sensor includes a bar at one of its ends, which is designed such that it can be mounted to an interior wall of the pipe or the pipeline.

13. The device according to claim 9, wherein the other end of the strain sensor being mounted to the pipe or the pipeline comprises the other end of the strain sensor being bonded or mechanically coupled to a wall of the pipe or the pipeline.

14. The device according to claim 13, wherein the end of the strain sensor being mounted to the towing head comprises the end of the strain sensor being bonded or mechanically coupled to the towing head.

15. The device according to claim 13, wherein the wall is an interior wall of the pipe or the pipeline.

16. The device according to claim 9, wherein the other end of the strain sensor being mounted to the pipe or the pipeline comprises the other end of the strain sensor being mounted to an interior wall of the pipe or the pipeline.

* * * * *